(12) United States Patent
Husak et al.

(10) Patent No.: US 8,103,238 B2
(45) Date of Patent: Jan. 24, 2012

(54) ENERGY-EFFICIENT OPERATION OF A COMMUNICATION NETWORK

(75) Inventors: Jan Husak, Prague (CZ); Frank Lahner, Amberg (DE); Peter Thamm, Weinheim (DE)

(73) Assignee: Siemens Aktiengesellschaft, Munich (DE)

( * ) Notice: Subject to any disclaimer, the term of this patent is extended or adjusted under 35 U.S.C. 154(b) by 643 days.

(21) Appl. No.: 12/308,280

(22) PCT Filed: Dec. 27, 2007

(86) PCT No.: PCT/EP2007/011439
§ 371 (c)(1),
(2), (4) Date: Dec. 11, 2008

(87) PCT Pub. No.: WO2009/083018
PCT Pub. Date: Jul. 9, 2009

(65) Prior Publication Data
US 2011/0250924 A1  Oct. 13, 2011

(51) Int. Cl.
*H04B 1/16* (2006.01)
(52) U.S. Cl. ............ 455/343.4; 455/500; 455/502; 455/572; 455/574; 455/127.1; 455/127.5; 455/343.1; 455/343.2; 370/311; 370/318
(58) Field of Classification Search .......... 455/500, 455/502, 507–516, 68–69, 572, 574, 127.1, 455/127.5, 343.1–343.6, 522; 370/311, 318
See application file for complete search history.

(56) References Cited

U.S. PATENT DOCUMENTS

| | | | |
|---|---|---|---|
| 6,192,230 B1 * | 2/2001 | van Bokhorst et al. | 455/343.3 |
| 6,483,815 B1 * | 11/2002 | Laurent et al. | 370/318 |
| 6,697,649 B1 * | 2/2004 | Bennett et al. | 455/574 |
| 7,389,436 B2 * | 6/2008 | Osborn | 713/323 |
| 7,421,257 B1 * | 9/2008 | Elliott | 455/127.5 |
| 7,551,592 B2 * | 6/2009 | van Kampen et al. | 370/338 |
| 7,613,156 B2 * | 11/2009 | Rittle et al. | 370/338 |
| 7,725,093 B2 * | 5/2010 | Sengupta et al. | 455/343.1 |
| 7,877,117 B2 * | 1/2011 | Abhishek et al. | 455/574 |
| 7,912,033 B2 * | 3/2011 | Heidari-Bateni et al. | 370/350 |
| 2006/0268891 A1 | 11/2006 | Heidari-Bateni et al. | |

FOREIGN PATENT DOCUMENTS

| | | |
|---|---|---|
| EP | 0 726 688 A1 | 8/1996 |
| EP | 0 740 481 A2 | 10/1996 |

* cited by examiner

*Primary Examiner* — Tuan A Tran

(57) ABSTRACT

A method for wireless communication between a base station and a number of devices is provided, with the devices in each case having a limited energy supply. To establish a connection, the base station sends a sequence of synchronization signals on at least one of its communication channels. The devices in each case listen on their parameterized or unparameterized communication channel within a listening period, which is repeated with a repetition frequency that can be set. Outside the listening period, the device in question is set to an energy-saving mode. The length of the listening period, the repetition frequency and the energy consumption in the energy saving mode are synchronized with each other in such a way that the energy consumption up to the connection setup averaged over time does not exceed the energy consumption during normal operation of the device.

8 Claims, 1 Drawing Sheet

ENERGY-EFFICIENT OPERATION OF A COMMUNICATION NETWORK

CROSS REFERENCE TO RELATED APPLICATIONS

This application is the US National Stage of International Application No. PCT/EP2007/011439 filed Dec. 27, 2007, and claims the benefit thereof.

FIELD OF INVENTION

The invention relates to a method for wireless communication between a base station and a number of devices parameterized or unparameterized in relation to the communication channel, with each of the devices have a limited energy supply, and with the base station having at least one search mode with a number of communication channels as well as a normal operating mode for communication with discovered devices, in the case of which synchronization signals are transmitted in a fixed time pattern on one of the communication channels.

BACKGROUND OF INVENTION

Such a method is already known from practice in communication networks. In this process, a device sends a telegram and subsequently waits for a limited period of time for a response. If this response does not arrive, the device then switches into an energy-saving mode, which is characterized in that at least the HF radio is switched off because it consumes the most energy. However, a disadvantage in this process is that the device does not take other devices or already reserved bandwidths in the selected channel into consideration. Such a device sends unsynchronized and in doing so may interfere in its own network or foreign networks. As an alternative to this, it is known that the device, during high energy consumption, listens in a channel whether or not the base station would like to set up a communication. For this purpose, synchronization signals sent by the base station are necessary so that the device can recognize available communication partners. In this case it is advantageous that the device acts in a passive manner and in this way cannot interfere with any other device. However, a precondition for this is a fixed time reference between the received synchronization signal and the subsequent permitted registration request. In the case of very large time intervals between the synchronization signals, the device must switch the HF radio to listen for the entire time interval and in this process, it has high energy consumption. If a number of channels are available for selection, the same process must be carried out for said channels, which makes the energy balance even worse.

SUMMARY OF INVENTION

An object of the present invention is to improve a method of the above-mentioned type to the extent that the devices can make do for as long as possible with their energy supplies during fast communication setup.

The object of the invention is achieved by a method according to the independent claim.

Advantageous further embodiments of the invention can be taken from the dependent claims.

BRIEF DESCRIPTION OF THE DRAWINGS

The invention is described in more detail below with reference to drawings, in which the figures are as follows.

DETAILED DESCRIPTION OF INVENTION

The inventive method relates to wireless communication between a base station with an unlimited energy supply and a number of devices parameterized or unparameterized in relation to the communication channel, which in each case have a limited energy supply. The aim is the efficient operation of such a wireless communication network. The problem which arises here is that, for setting up the connection for communication, the devices must be operated in a listening mode with an HF radio switched on for a longer period, with the power consumption being greater in such cases compared with normal operation. With the communication method described in this document the relevant device does not consume more energy averaged over time than is the case during normal operation. If the device transmits during normal operation for example once per second for a millisecond, then this corresponds to a load of 0.1%.

Figure 1:
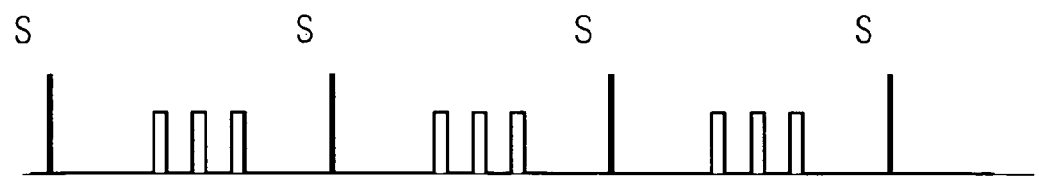
FIG. 1 shows the normal operating mode of a base station.

In a base station it is possible to distinguish between three operating conditions. During normal operation, communication with the discovered devices and the selected devices of the communication network takes place in accordance with a fixed protocol. This normal operating mode is shown in FIG. 1. In this process, a synchronization signal (S) is repeatedly sent by the base station on one of the communication channels (1, 2, 3 . . . 16). Between two synchronization signals (S), in a fixed time pattern, communication time blocks are used for communication between the base station and the connected devices. In addition the base station has two search modes for a connection setup with the devices. In a first search mode, devices are searched for on all the parameterized or unparameterized communication channels or on selected parameterized or unparameterized communication channels. In a second search mode, devices are searched for on a defined communication channel.

In the devices two communication conditions may occur. A parameterized device is available for communication on a defined channel. However, although an unparameterized device possesses a random default channel, it can also switch this in accordance with criteria to be stipulated.

In principle, a device does not know after being switched on the mode in which the base station is and whether or not it is available at all. It must therefore always act in the same way. A device that sends in an unsynchronized manner may disturb its own network or foreign networks. In order to prevent this, the devices may not send in accordance with the method according to the invention. Instead, the devices should merely listen and do this as little as possible.

Figure 2:
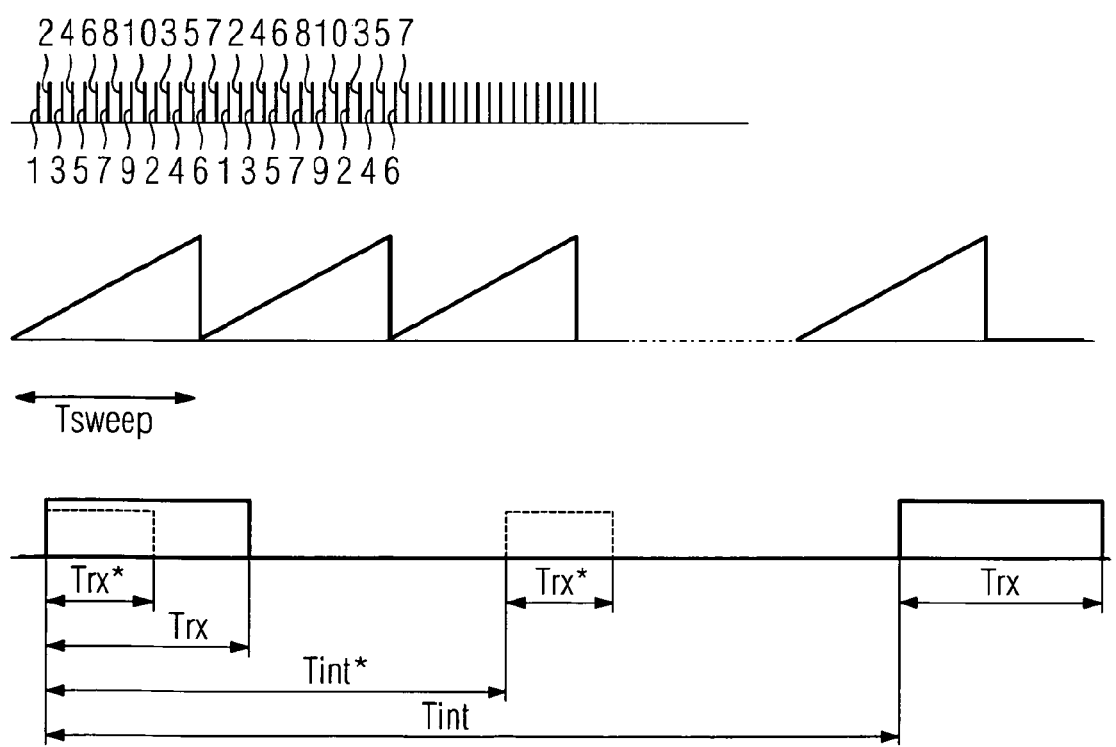
FIG. 2 (top) shows a sequence of synchronization signals on a number of communication channels, FIG. 2 (center) shows a plurality of successive sweep processes with a sequence of synchronization signals in each case on a number of communication channels and FIG. 2 (bottom) shows a listening mode with a listening time adapted to the sweep processes in accordance with FIG. 3 and with a correspondingly shortened listening time.

In an initializing phase there is productive exchange of data between the base station and the devices. As a result, the base station is in the position to send synchronization signals (S) in a sequence and successively to all the desired communication channels and to wait after each synchronization signal (S) for a short while for possible responses. FIG. 2 (top) shows for example the communication channels to which at least one synchronization signal (S) is sent in each case. The base station repeats this sweep process in accordance with FIG. 2

(center) until a specified end criterion has been reached such as for example timeout, all parameterized devices available, etc. During the time Tsweep, all the desired communication channels (1, 2, 3 . . . 16) are scanned. If the number of the communication channels to be searched for is lower than the maximum number, the missing communication channels are made up by means of repetitions. If for example only 10 communication channels are used out of a maximum of 16 communication channels (see FIG. 2 top), a possible sequence is 1, 2, 3, . . . , 10, 1, 2, 3 . . . ; 1, 2, 3 . . . , 10, 7, 8, 9, 10, 1, 2; 1, 2, 3 . . . , 10, 3, 4, 5 . . . , 8; etc.

If, for example, a synchronization signal with a reserved response time interval lasts for 4 ms, then the time Tsweep 16*4=64 ms is produced for 16 communication channels.

device listens during a listening period Trx that can be set in accordance with FIG. 2 (bottom), which is at least the same as or a little longer than the time Tsweep, i.e. approximately 1 response time interval longer than that of the time Tsweep. In this case, the device can operate on a parameterized communication channel or an unparameterized communication channel. In said case, it is guaranteed that the device receives a synchronization signal on its communication channel and can respond accordingly. This establishes the connection to the base station. In the rare case of an access conflict with another device, the process will be repeated during the next listening phase. The time window with the listening period Trx will likewise be repeated after a repetition period Tint that can be set. In the time intervals outside the listening period Trx, the device in question is switched to an energy-saving mode. In the energy-saving mode, loads such as for example the HF radio are switched off.

The length of the listening period Trx, the repetition frequency Fw(=1/Tint) and the energy consumption in the energy-saving mode are synchronized with each other for the device in question in such a way that its energy consumption up to the connection setup averaged over time does not exceed the energy consumption during normal operation, with the device in the normal operating mode, for example, by communication with the base station can have a specific energy consumption.

In the case of a permissible loading of the device of for example 0.1% and a listening period Trx of 60 ms, a repetition period Tint of 60 s is obtained. This means that after approximately 60 s, all the devices have been identified on all the communication channels.

The repetition period Tint of the listening process results in $$\text{Tint} = \frac{\text{Enormal} - \text{Phör} * \text{Trx}}{\text{Pspar}} + \text{Trx}$$

Enormal: Energy consumption in the normal operating mode during the period Tint
Phör*Trx: Energy consumption during the listening process
Trx: Listening period
Pspar: Efficiency in the energy-saving mode.

If the listening period Trx in accordance with FIG. 2 (bottom) is shortened to the listening period Trx*, for example halved, then it is possible, in the case of an unchanged load, for the repetition period Tint to be shortened accordingly to the repetition period Tint*. The listening period Trx* is shorter than the time Tsweep. In this case, two successive listening processes must be carried out at different time intervals in such a way that the communication channels which were not identified during the first listening process are at least identified during the subsequent listening process. The shorter repetition period Tint* increases the probability of a faster connection setup.

The described connection setup applies to both parameterized and unparameterized devices in the same way, i.e. it is to be achieved under the same timing conditions.

In the case of the additional search mode that has already been mentioned above, the base station is parameterized in such a way that it sets up a network on a specified communication channel. In this process, it will not scan all the communication channels, but instead transmit synchronization signals (S) on the same parameterized communication channel. In this case, the base station with a view to setting up a connection with the devices, sends a sequence of synchronization signals (S) on one of the communication channels (1, 2, 3 . . . 16), which is followed by a sequence of synchronization signals (S) on another one of the communication channels (1, 2, 3 . . . 16).

In this case, there are two possibilities which emerge for a parameterized device. If the device is set to another communication channel, correctly no contact will be made. Evidently the device should then be assigned to another network. On the other hand, if the parameterized communication channels correspond, then the device will react to a synchronization signal (S) within the next listening phase. This will also be the case just as in the above-mentioned search mode at the latest after the repetition period Tint. Because the synchronization signals (S) occur on the same communication channel, but considerably more frequently than is the case for the above-mentioned sweep processes, the average time for the connection setup is shorter in this case.

This also applies to the connection setup in the case of unparameterized devices. If the default channel of the device corresponds to the communication channel of the base station, a registration can take place. However, this will tend not to be the case in general. It depends on the requirements as to how an unparameterized device will be handled in the network. In such cases it is possible to distinguish between two possibilities.

In the first case, unparameterized devices are not taken into consideration. If the default channel does not correspond to the communication channel of the base station, then no contact will be made and the process will be ended. In the rare case of the chance correspondence of the two communication channels, the device will not be accepted by the base station, because it is unparameterized. The unparameterized device then independently changes its default channel.

In the second case, unparameterized devices should be taken into consideration. This has the advantage that for example malfunctioning devices could be replaced by new devices without the need for any additional parameterized auxiliary means. Because in the case of the prevailing configuration, the communication channel of the base station does not vary, this has to take place on the side of the device. If the device periodically changes communication channels slowly, non-searching base stations can also be found in this way on account of their synchronization signals. A precondition for this is that the search interval of the device and the interval of the synchronization signals during normal operation of the base station shift over time. This can easily be implemented by means of a corresponding setting on the device.

Essentially the following advantages are obtained with the inventive method:
the setting up of the wireless communication link does not consume more energy than the device consumes during normal operation, the devices listen at all times and in doing so always act in a passive manner, the fragmentation the listening period over one or more communication channels enables the search duration to be shortened.

The invention claimed is:

1. A method for wireless communication between a base station and a plurality of devices, each of the devices having a limited energy supply, the base station having a search mode with a plurality of communication channels as well as a normal operating mode for communication with the devices, wherein synchronization signals are transmitted in a fixed time pattern via one of the communication channels, the method comprising:

sending a sequence of synchronization signals by the base station via one of the communication channels to establish a connection with the devices;

listening to the sequence of synchronization signals by the devices via the communication channel within a listening period set for each device with a repetition frequency;

switching the devices to a energy-saving mode in at least some time intervals outside the listening period; and synchronizing the length of the listening period, the repetition frequency and a energy consumption in the energy-saving mode with each other for the devices such that a energy consumption up to the connection setup averaged over time does not exceed a energy consumption during normal operation, wherein the devices have a specific energy consumption in the normal operating mode by communicating with the base station.

2. The method for wireless communication as claimed in claim 1, wherein the plurality of devices are parameterized or unparameterized in relation to one of the communication channels.

3. The method for wireless communication as claimed in claim 1, further comprising:

sending a sequence of synchronization signals by the base station via a first channel of the communication channels, followed by a sequence of synchronization signals via a second channel of the communication channels to establish a connection with the devices.

4. The method for wireless communication as claimed in claim 1, further comprising:

carrying out a number of successive sweep processes by the base station to establish a connection with the devices, wherein a sequence of synchronization signals in each sweep process is sent via a different communication channel.

5. The method for wireless communication as claimed in claim 1, wherein each device varies its communication channels.

6. The method for wireless communication as claimed in claim 5, wherein each device varies its communication channels periodically.

7. The method for wireless communication as claimed in claim 5, wherein each device communicates via another communication channel after communicating via one of the communication channels for a longer time interval.

8. The method for wireless communication as claimed in claim 1, wherein the energy-saving mode is switched on for the entire period outside the listening periods.

* * * * *